July 26, 1938.  D. R. HILLIS  2,124,948

FEEDER FOR REVERSIBLE FLUID SYSTEMS

Filed May 9, 1936

INVENTOR.
David R. Hillis
BY Ralph S. Binns
ATTORNEY.

Patented July 26, 1938

2,124,948

UNITED STATES PATENT OFFICE 2,124,948

FEEDER FOR REVERSIBLE FLUID SYSTEMS

David R. Hillis, Detroit, Mich., assignor to Trabon Engineering Corporation, Cleveland, Ohio, a corporation of Ohio Application May 9, 1936, Serial No. 78,784

3 Claims. (Cl. 184—7)

The present invention relates to improvements in feeders for a lubricating system of the single pipe line flow-reversing type and is a continuation in part of my application Serial No. 738,656, filed August 6, 1934. This application is a continuation in part of the feeder disclosed but not claimed per se in my said former application.

In my former Patent No. 1,997,406, I disclosed three species of feeders of the single pipe line flow-reversing type and the present invention is a specific improvement over those therein described and claimed. In all feeders of this nature, unless springs are used for aiding the action of the by-pass valves, there is a tendency for the by-pass valves to permit fluid to pass right through the feeder without discharging a quantity of lubricant to its associated bearing or other receiving device. This tendency is more noticeable when the feeders are mounted so that the by-pass valve chambers are in a vertical position, thus permitting gravity to act on the valves when the system is at rest, especially when light oil is used as the lubricant.

An object of the present invention is therefore the provision of a feeder that is more efficient in operation and less likely to fail to operate regardless of the position in which it may be mounted and regardless of the medium which it handles.

All former feeders of this type were so constructed that flow of lubricant through the feeder to the pipe line or conduit was restricted.

It is therefore another object of this invention to provide a feeder with sufficient clearance through the by-pass passages to permit unrestricted flow of fluid under pressure.

Figure 1:
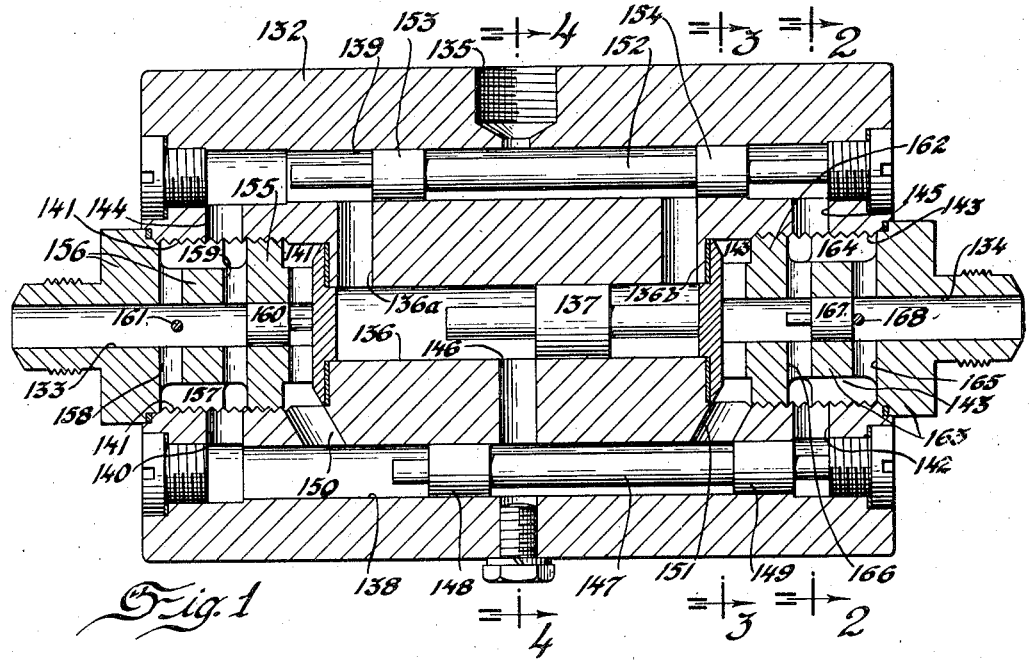
Figure 2:
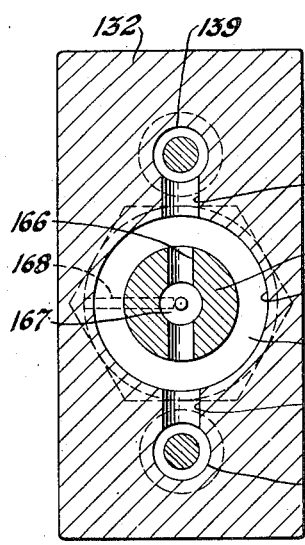
Figure 3:
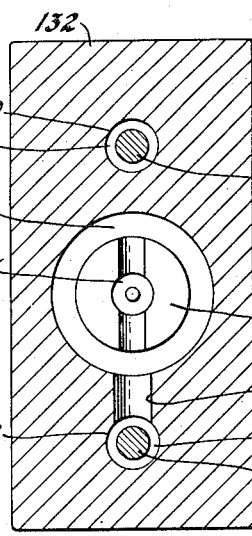
Figure 4:
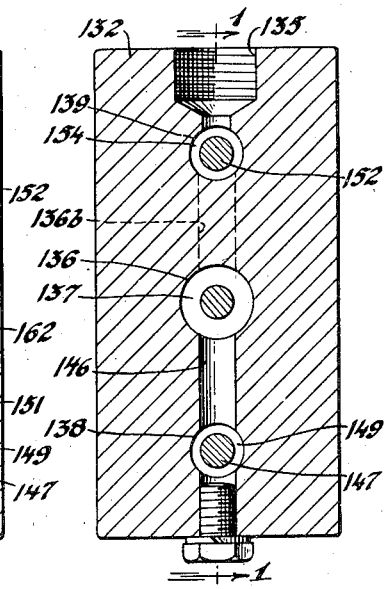

The invention is fully disclosed by way of example in the following description and in the accompanying drawing in which:

Fig. 1 is a sectional view of a feeder embodying the present invention taken on the line 1—1 of Fig. 4, Fig. 2 is a sectional view of my feeder taken on line 2—2 of Fig. 1, Fig. 3 is a sectional view of my feeder taken on line 3—3 of Fig. 1, and Fig. 4 is a sectional view of my feeder taken on line 4—4 of Fig. 1.

Reference to these views in which like characters are employed to designate like parts throughout will now be made.

The numeral 132 designates the body portion in which I provide two oppositely disposed dual-service ports 133 and 134, each being adapted for connection by any suitable means to a pipe line or conduit which forms part of the circuit or system in which such feeders are used. The body portion is also provided with a discharge port 135 adapted for connection to a branch pipe or to an associated device or to a bearing or a receiving device.

The body portion is provided with a cylinder 136 in which is mounted a reciprocable fluid pressure-operating piston 137. The body is also counterbored at the ends of this cylinder 136 to permit suitable cylinder heads to be inserted as shown and to form what may be considered valve chambers 141 and 143 in which end plugs 156 and 163 with suitable floating valves and passages may be inserted.

Two cylindrical valve chambers 138 and 139 are also provided in the body and they are preferably disposed on opposite sides of the cylinder and preferably parallel thereto. The valve chamber 138, at one end, has a duct 140 communicating with port 133 through passages in the plug 156 which is inserted in valve chamber 141 and, at the other end, said valve chamber 138 has a duct 142 communicating with port 134 through passages in the plug 163 which plug is inserted in valve chamber 143.

One end of valve chamber 139 has a duct 144 communicating with port 133 through passages in the plug 156 which is inserted in the valve chamber 141 and the other end of said valve chamber 139 has a duct 145 communicating with port 134 through passages in the plug 163 which is inserted in the valve chamber 143. At each end of the cylinder 136 there is an inlet and outlet duct or service port, one being designated as 136ª and the other as 136ᵇ, and these ducts or ports communicate with intermediate portions of the valve chamber 139 as hereinafter described.

The discharge port 135 communicates with the central portion of the valve chamber 139 and a central communicating or by-pass port or passage 146 connects the central portion of valve chamber 138 with the central portion of cylinder 136.

A dumb-bell piston type valve 147 having two heads 148 and 149 is mounted in the valve chamber 138 in such manner that the annular passage surrounding the reduced portion between said valve heads 148 and 149 always registers, when the valve is shifted to either of its extreme positions, with the communicating passage 146 and with one or the other of two by-pass ducts 150 and 151 communicating respectively with suitable passages in the plugs inserted in valve chambers 141 and 143 or they may be said to communicate directly with said respective valve chambers.

The valve chamber 139 has a similar dumbbell piston type valve 152 having heads 153 and 154 so arranged that the annular passage surrounding the reduced portion between said valve heads 153 and 154 always connects one of the ducts or ports 136ᵃ or 136ᵇ with the discharge port 135, when the valve 152 is in either one of its shifted positions, and, at the same time, opens the other duct 136ᵃ or 136ᵇ to the flow of fluid from the conduit or pipe line of the associated system.

Each of the plugs 156 and 163 is the equivalent of the corresponding parts shown in Fig. 5 of the drawing in my application Serial No. 738,656 wherein it is said:

"Mounted in the valve chamber 141 outwardly of opening of by-pass duct 150, is a valve disk 155 having a central opening with an outwardly extending ported sleeve 156 communicating with the port 133, the said sleeve having an outer diameter less than the inner diameter of the valve chamber 141, thus providing a passage 157 around said sleeve. In other words, this passage 157 is, in reality, a portion of the valve chamber 141 in which the disk and sleeve is mounted. Said sleeve 156 is ported at 158 and at 159 and mounted in said sleeve and in said disk is a reciprocating piston valve 160 having a length equal to the portion of the sleeve between the two ports 158 and 159. A stop pin 161 is mounted in said sleeve 156 to stop the outward movement of said valve 160 in such position that lubricant or other fluids flowing into the valve chamber 141 from the by-pass passage 150 may flow through the disk 155 and into its extending sleeve and out of port 159, thence through passageway 157 and back into sleeve 156 through port 158, and thence through port 133 in to the pipe line when flow of lubricant through the circuit is passing in that direction.

"Mounted in the valve chamber 143 outwardly of opening of by-pass duct 151, is a valve disk 162 having a central opening with an outwardly extending ported sleeve 163 communicating with port 134, the said sleeve having an outer diameter less than the inner diameter of the valve chamber 143, thus providing a passage 164 around said sleeve. In other words, the passage 164 is, in reality, a portion of the valve chamber 143 in which the disk and sleeve is mounted. Said sleeve 163 is ported at 165 and at 166, and mounted in said sleeve and in said disk is a reciprocating piston valve 167 having a length equal to the portion of the sleeve between the two ports 165 and 166. A stop pin 168 is mounted in said sleeve 163 to stop the outward movement of said valve 167 in such position that lubricant or other fluids flowing into the valve chamber 143 from the by-pass passage 151 may flow through the disk 162 and into its extending sleeve and out of port 166, thence through passage-way 164 and back into sleeve 163 through port 165, and thence through port 134 into the pipe line, when flow of lubricant through the circuit is passing in that direction.

"Any suitable means such as the abutment members shown on the inner ends of valves 160 and 167 may be used to stop the respective inner strokes of said valves by contact against suitable plugs, which close the ends of valve chamber 136, in such position that lubricant may enter behind them, when necessary, to make the return strokes."

Similarly, I provide a reduced portion or circumferential groove on the inner end of each plug and I bore a passage diametrically therethrough so that fluid may pass into the cylindrical bore of the plug on the inner side of the floating valve exactly as it could do so in the embodiment of my invention shown in Fig. 5 of the aforesaid application of which this is a continuation.

The floating valves 160 and 167 are mounted in the cylindrical bore of these plugs just as they were in the sleeves of my former application and the same type of stop pins 161 and 167 are provided to limit the outer movement of said valves so as always to keep respective ports 158 and 165 open.

The operation of my improved feeder is as follows, assuming the feeder to be connected up in a reversible-flow fluid distributing system and that fluid under pressure is flowing thereinto from the right through port 134:

As the floating valve 167 is mounted in the direct line of flow of the fluid under pressure, it quickly shifts to block fluid from flowing around it and into passage 151. The fluid can then only pass through ports 165, ducts 143 and/or through port 166 into circumferential groove 164, thence through ducts 142 and 145 respectively into the right hand end of valve chambers 138 and 139, causing the dumbbell pistons therein to shift to the left. No further fluid can then flow through the right hand end of valve chamber 138 but the right-hand end of valve chamber 139 now communicates with cylinder 136 through service port 136ᵇ.

Pressure now builds up on the right hand side of the piston causing it to move to the left, thus discharging the predetermined quantity of fluid that was on the left of the piston, having been charged by a previous operation. This discharge flows out of the cylinder through port 136ᵃ into valve chamber 139 between valve heads 153 and 154 and thence out the discharge port 135.

As the flow of fluid into the feeder continues from the right, it by-passes out of cylinder 136 through the central by-pass port or duct 146 into valve chamber 138 between valve heads 148 and 149 which then guide it into by-pass duct 150 from whence it flows into the inner end of valve chamber 141, which in this embodiment comprises a circumferential groove around the inner end of plug 156 and thence through the connecting port into the central bore in the plug, forcing valve 160 to the left, then it passes around valve 160 through port 159, circumferential groove 157, and the ducts which correspond to the outer portion of valve chamber 141 and through duct 158 and thence out port 133.

As the reverse operation is obvious, it is not thought necessary to describe it.

It is readily understood that various changes and modifications may be made in the construction of the improvement as I have but described and illustrated its preferred embodiment and I do not desire to be limited other than by the prior art and the scope of the appended claims.

I claim:

1. A lubricating device comprising a body provided with a delivery port, a pair of dual-service ports, a pair of flow-control chambers, one communicating directly with one dual-service port and the other with the other dual-service port, a floating valve in each of said chambers adapted to prevent flow of lubricant under pressure into the innermost portion of its associated control chamber from its associated dual-service port and to permit lubricant entering the innermost portion of its associated control chamber to flow out through its associated dual-service port, a cylinder and a piston in said cylinder, a communicating passageway opening to both of said control chambers and communicating with said delivery port, a duct at each end of said cylinder communicating with said communicating passageway, valve means in said communicating passageway controlling the lubricant supplied to said cylinder under pressure and controlling the discharge therefrom of the measured quantity of lubricant, a second communicating passageway opening to said control chambers near the outer portions thereof, a duct connecting said second communicating passageway with said cylinder, a by-pass duct near each end of said second communicating passageway, each by-pass duct permitting flow of lubricant from said second communicating passageway to the inner portion of its associated flow-control chamber, and valve control means adapted to block said second communicating passageway to the continued flow of lubricant entering from one of said control chambers and to direct lubricant entering said second passageway from said cylinder to pass from said second passageway into the other control chamber.

2. A feeder for lubricating bearings comprising a body having a cylinder, a piston reciprocable in said cylinder, said body having two dual-service ports each serving alternately as loading and discharge ports to a lubricant conveying means capable of conducting lubricant under pressure in either direction, a pair of flow-directing control chambers, one associated with one of said ports and the other with the other of said ports, a member mounted in each of said control chambers, said member having a bore and an outwardly extending sleeve, a floating valve mounted to reciprocate in the bore of said sleeve portion of said member between fixed stop means and adapted to prevent inward flow of lubricant through said member, ports in said sleeve adapted to permit lubricant flowing through the bore of said member from the inner side thereof to pass around said valve and out of its associated dual-service port, a valve chamber connecting said control chambers at points adjacent the outer ends thereof, ducts at each end of said cylinder communicating with said valve chamber, and a discharge port communicating with said valve chamber and adapted for connection to a bearing, valve means adapted to direct lubricant under pressure entering either one of said dual-service ports to flow through said valve chamber and through one of said ducts into said cylinder on one side of said piston and to direct lubricant being discharged from the other side of said piston to flow through said other duct and into said valve chamber and out through the discharge port, a second valve chamber connecting said control chambers at points adjacent the outer ends thereof and communicating with said cylinder, a by-pass duct near each end of said second valve chamber communicating with each control chamber adjacent its inner end, and valve means adapted to close said valve chamber and by-pass ducts to the direct and continuous flow of lubricant therethrough, and adapted to direct lubricant entering said valve chamber from said cylinder to flow through a by-pass duct and control chamber to the dual-service port opposite the one through which lubricant is entering the device.

3. A lubricating device adapted for application to a system wherein lubricant may flow in either direction through a lubricant conveying means forming a circuit from a source of supply to a plurality of bearings and back to said source of supply, comprising a body member having a plurality of inlet and outlet flow-control chambers each having a dual-service port adapted for connection to the lubricant conveying means and a discharge port adapted for connection to a bearing, a cylinder for lubricant within said body, a piston within said cylinder, ducts to said cylinder and adapted to act as an outlet and inlet passage, a cylindrical passage opening to said inlet and outlet ducts and communicating with said body member inlet and outlet control chambers and with the discharge port to the bearing, and a piston valve in said cylindrical connecting passage for controlling by pressure on the lubricant the alternate flow of lubricant into said cylinder and the filling of said cylinder first on one side and then on the other side of said piston, and for controlling the alternate discharge of lubricant into the bearing first from one side and then from the other side of said piston, a second cylindrical passageway opening to the body member inlet and outlet control chambers and associated ports to the lubricant conveying means and communicating with said cylinder, a by-pass duct near each end of said second cylindrical passage communicating therewith and with the inner portion of the body member inlet and outlet control chamber adjacent the end of said passage, means in each of said flow control chambers adapted to permit lubricant to flow therefrom into both of said cylindrical passages and to block the direct flow therefrom into its associated by-pass duct while permitting flow of lubricant from said by-pass duct to its associated dual-service port upon a reversal of flow, and valve means adapted to close said second cylindrical passageway to the inflow of lubricant from the lubricant conveying means and to direct lubricant flowing out of the cylinder, after the cylinder has discharged lubricant to the bearing, to flow through the by-pass duct and the control chamber to the dual-service port connected to the lubricant conveying means which is opposite the one through which lubricant is then entering the device.

DAVID R. HILLIS.